United States Patent [19]

Marchetti et al.

[11] Patent Number: 4,524,107
[45] Date of Patent: Jun. 18, 1985

[54] TOUGHENED THERMOSET LAMINATES

[75] Inventors: Joseph R. Marchetti, Hempfield Township, Westmoreland County; Zal N. Sanjana, Penn Hills, both of Pa.

[73] Assignee: Westinghouse Electric Corp., Pittsburgh, Pa.

[21] Appl. No.: 591,359

[22] Filed: Mar. 20, 1984

[51] Int. Cl.$^3$ .............................................. B32B 27/38
[52] U.S. Cl. ...................... 428/413; 156/242; 156/330; 428/290; 523/409; 523/412; 523/414
[58] Field of Search ............... 523/409, 412, 414, 222; 428/413, 290; 156/242, 330

[56] References Cited

U.S. PATENT DOCUMENTS

| | | | |
|---|---|---|---|
| 3,641,195 | 2/1972 | Ball et al. | 525/119 |
| 3,806,483 | 4/1974 | Juba et al. | 523/412 |
| 3,905,931 | 9/1975 | Ziegert | 525/119 |
| 3,941,857 | 3/1976 | Wu | 525/120 |
| 4,009,224 | 2/1977 | Warnken | 525/119 |
| 4,222,918 | 9/1980 | Zentner et al. | 523/409 |

FOREIGN PATENT DOCUMENTS 949460  2/1964  United Kingdom ............... 523/409

Primary Examiner—Lewis T. Jacobs
Attorney, Agent, or Firm—Richard D. Fuerle

[57] ABSTRACT

Disclosed is a water-based thermosetting epoxy composition of a water compatible epoxy resin, about 5 to about 35%, based on a total solids, of a water compatible impact modifier, about 1.5 to about 7%, based on the weight of the epoxy resin, of a water compatible epoxy hardener, up to about 0.3%, based on the weight of the epoxy resin, of a catalyst, and sufficient water to provide a viscosity of about 100 to about 500 centipoises. The impact modifier is a copolymer of about 10 to about 60% ethylene, propylene, or mixtures thereof, and about 40 to about 90% vinyl acetate, vinyl chloride, or mixtures thereof. Also disclosed are laminates prepared from this composition and a method of preparing them.

16 Claims, No Drawings

TOUGHENED THERMOSET LAMINATES

BACKGROUND OF THE INVENTION

In recent years the demand for filamentary reinforced composites that have improved mechanical properties has risen due to new applications in magnetic fusion energy, magnetohydrodynamics, and a variety of industrial and aerospace components. Epoxy resins are widely used in making these composites because they convert from a liquid or thermoplastic state to a chemically resistant thermoset solid state without the evolution of volatile materials. Also, epoxy resins exhibit the strength, adhesion, chemical resistance, and cure versatility that these composites require.

Epoxy resins are especially suitable for laminating applications where a "prepreg" or resin impregnated substrate of a fibrous material must be prepared. The epoxy resin in combination with curing agents and optional additives is usually dissolved in a suitable solvent, deposited or impregnated onto the substrate, and partially cured (B-staged) to produce a dry or, in some cases, a tacky resin impregnated substrate. The B-staged prepreg is then optionally stacked or individually laminated (fully cured) by application of heat and pressure.

Because epoxy resin systems are inherently brittle, it is difficult to produce composites having mechanical properties associated with "toughness" such as impact and crack resistance. While some toughened epoxy resins have been produced by modifying the epoxy resin with various low molecular weight epoxy, amine, or carboxy terminated elastomers, the resulting composites still lack the impact strength desired for many modern high technology applications. The incorporation of higher molecular weight elastomers into an epoxy matrix has not been possible because the higher molecular weight elastomers are not readily soluble in the epoxy resins nor are the epoxy resins readily soluble in the elastomers. Also, because of thermodynamic considerations, it is not normally possible to dissolve both the epoxy resin and a high molecular weight elastomer in a common solvent. In the manufacture of laminates, dilute solutions of high molecular weight polymers requires an uneconomically large number of passes to obtain an adequate build on a substrate.

SUMMARY OF THE INVENTION

We have discovered that high molecular weight elastomers, even elastomers which cannot form covalent bonds with epoxies because they lack epoxy, amine, or carbolylic termination, can nevertheless be incorporated into epoxy resins without mutual coagulation, to produce a composition having a low viscosity. This is accomplished by using elastomers which are in latex form, and are produced by emulsion polymerization, and by using epoxy resins which are water dispersible. The toughened thermosetting compositions of this invention have been used to make composites which have higher impact strengths, higher fracture toughness, and better damping than composites previously prepared from the low molecular weight elastomers. The composites can also be made flame retardant by the use of a vinyl chloride containing impact modifier. Finally, the compositions of this invention are not limited to the use of low molecular weight polymers, as were prior elastomer toughened epoxy resins. The use of high molecular weight materials results in a better quality laminate because low molecular weight materials tend to migrate out of the laminate unless cross-linked.

DESCRIPTION OF THE INVENTION

The composition of this invention is a water-based impregnant, and is an intimate stable emulsion of a water emulsifiable thermosettable epoxy resin, a water compatible epoxy hardener, an impact modifier, and sufficient water to produce the desired viscosity. The composition may also include various fillers, and a catalyst to promote cure of the epoxy resin.

Any epoxy resin which is water emulsifiable and thermosettable may be used in the composition of this invention. These epoxy resins are normally furnished in water but they may contain a few percent of an organic solvent such as methyl cellosolve as a coupling agent. The epoxy resin emulsion should have a pH between about 6 and about 8 as lower and higher pH values result in the hydrolysis of the oxirane groups. Examples of types of epoxy resins which may be used in this invention include diglycidyl ethers of bisphenol A, diglycidyl ethers of bisphenol S, novolak epoxies, cycloaliphatic epoxies, hydantoin based epoxies, and prebrominated epoxies. The epoxy resin preferably has an E.E.W. (epoxy equivalent weight) of about 100 to about 1,000.

The epoxy hardener performs the function of cross-linking the epoxy resin. Virtually any water compatible epoxy hardeners can be used, such as dicyandiamide, water dispersible phenolic hardeners, or various amino hardeners such as diethylene triamine or diamino diphenyl sulfane. However, the preferred epoxy hardener is dicyandiamide because it is very water soluble.

It is preferable to include a water compatible epoxy catalyst in the composition to accelerate the cross-linking reaction of the hardener with the epoxy resin. The catalyst used will depend upon the particular hardener selected. The preferred catalyst is 2-methylimidazole (2-MI) because it works well with dicyandiamide, the preferred hardener. Other catalysts which may be used include tertiary amines such as benzyldimethylamine, dimethylamino phenols, and other amines.

The impact modifier is a polymer which, upon curing, forms a discontinuous phase in the continuous phase of the epoxy resin. The impact modifier is in the form of a water-based latex, which is a type of emulsion. That is, the impact modifier must be water compatible, which means either water soluble, water dispersible, or water emulsifiable. These impact modifiers are synthesized (i.e., polymerized) in water with no organic solvent being present. The impact modifiers used in the composition of this invention are copolymers of an ethylenic monomer and a vinylic monomer copolymerizable therewith in an emulsion polymerization process. The ethylenic monomer may be ethylene, propylene (including isopropylene) or a mixture thereof. Ethylene is preferred because its copolymers are commercial products. The vinylic monomer may be vinyl acetate, vinyl chloride, or a mixture thereof. The copolymer is about 10 to about 60% (all percentages herein are by weight) of the ethylenic monomer and about 40 to about 90% of the vinylic monomer, based on the total weight of the ethylenic monomer and the vinylic monomer. In addition, the copolymer may contain sufficient acrylic monomer to give an acid value of about 1 to about 60. The acrylic monomer may be acrylamide, acrylic acid, methacrylic acid, or a mixture thereof. Acrylic acid or methacrylic acid is preferred as they are more reactive with epoxy resins.

The composition may include various optional components such as dyes, pigments, flame retardants, and fillers. Common fillers include calcium carbonate, aluminum trihydrate, silica, and quartz.

The composition comprises the epoxy resin, about 5 to about 35% (by weight based on total resin solids weight) of the impact modifier, an effective amount (typically about 1.5 to about 7% based on epoxy resin weight) of the hardener, and an effective amount (typically up to about 0.3% based on epoxy resin weight) of the catalyst. The composition may also include up to about 50% (based on resin solids) of a filler.

For impregnating fibrous substrates, enough water is included in the composition to produce a viscosity of about 100 to about 400 centipoises. If a lower viscosity composition is used, the fibrous substrate will not pick up enough of the composition in a single pass and more than one pass will be necessary. If a higher viscosity is used, too much of the resin in the composition will be picked up on the fibrous substrate and air may be entrained in the composition. While the composition may be prepared in any order, it is preferable to dissolve the hardener in water, then add the catalyst, then add the dispersion in water of the epoxy resin, and finally add the impact modifier in water, all with vigorous stirring.

The impregnation of a fibrous substrate may be conducted in a conventional manner as is well-known in the art. The fibrous substrate may consist of paper, cloth, glass cloth, carbon fabric, synthetic fabric, or other suitable materials. Impregnation can be performed at room temperature, preferably at a ratio of about 30 to 50% resin and about 50 to 70% (based on total laminate weight) fibrous substrate. After the fibrous substrate has been impregnated with the composition, the impregnated substrate is heated to evaporate the water, which coacervates or coagulates both phases, and to B-stage (partially react) the epoxy resin. This can be accomplished at a temperature of about 120° to about 180° C. The resulting B-staged prepregs are stacked in a press and are laminated, typically at about 150° to 220° C. and about 500 to about 1000 psi.

The compositions of this invention can also be spray dried, which is accomplished by misting the composition in hot air to evaporate the water and produce a B-staged powder. The B-staged powder then can be compression molded or injection molded under heat and pressure, as is known in the art, to C-stage (fully react) the resin and produce various shaped products. The resulting product, when cured, has a discontinuous rubbery phase dispersed uniformly throughout a hard, glassy continuous cross-linked epoxy phase. These compositions may also be spray dryable to produce molding powders.

The following examples further illustrate this invention.

EXAMPLES

The starting materials used in these experiments are described as follows.

Dicyandiamide was the crosslinker or hardener utilized to effect cure of the epoxy resin. It is the hardener of choice but other water dispersible types including amines, phenolics, and the like could be utilized to effect cure of the epoxy resin. "CMD 35201" is a nonionic, aqueous dispersion of an epoxy resin of EEW=640 gm/equiv. (on solids) supplied at 60% total solids in water by Celanese Plastics and Specialties Company. The catalyst of choice is 2-MI and it was utilized to enhance the reactivity of the dicyandiamide during lamination. In addition, 2-MI in combination with dicyandiamide promotes proper B-staging and good cure characteristics. "Airflex 416" (Tg=0° C.) is a high molecular weight ($>5.0 \times 10^4$ gm/mole), lightly carboxylated terpolymer designed for adhesives applications of vinyl acetate, ethylene, and a third monomer which imparts the carboxyl functionality (believed to be acrylic acid) supplied by Air Products Company at 52% total solids. "EVCL 4814" (Tg=14° C.) is also an emulsion terpolymer but is composed of ethylene, vinyl chloride, and a third monomer which imparts low levels of carboxyl functionality. This material is supplied at 47% total solids and contains ≈40% chloride functionality on a non-volatile basis. EVCL 4814 has a molecular weight of at least $5.0 \times 10^4$ gm/mole. "Airflex 400" (Tg=0° C.) is a high molecular weight 80/20 vinyl acetate/ethylene emulsion copolymer supplied at 55% solids by the Air Products Company. "EVCL 4500" (Tg=0° C.) is an Air Products Company emulsion terpolymer of ethylene, vinyl chloride, and a third monomer which imparts a low level of amide functionality. EVCL 4500 contains 39% (by weight) chlorine and is supplied at 50% total solids. "Epon 828" is essentially the diglycidyl ether of 2,2-bis(4-hydroxyphenyl)propane. The material is made by reaction of epichlorohydrin with bisphenol-A. Epon 828 has an average equivalent weight of 188.5 gm/equiv. "DER 661-A-80" is a diglycidyl ether type epoxy resin supplied by the Dow Chemical Company at 80% total solids in acetone. DER 661-A-80 has an epoxide equivalent weight of 525 gm/equiv.

Compositional data along with B-staging and laminating conditions for resin systems which demonstrate the advantages of our compositions are presented in Table 1. In Table 1 laminate E serves as a control and therefore was not modified with impact modifier. This material is essentially a NEMA grade G-10 epoxy-glass fabric laminate which is characterized by extremely high mechanical strength at room temperature.

Impregnating varnishes A, B, C, and D were formulated by first dissolving dicyandiamide in water. This was accomplished by charging an appropriate amount of water into a container fitted with a propeller-type agitator and a means for heating. The water was heated to 70° C. and dicyandiamide slowly added while agitating and maintaining the water at 70° C. Stirring and heating were continued for 30 minutes after the dicyandiamide had dissolved. After the dissolution of dicy was completed the 2-MI catalyst was charged and dissolved in the dicy/water solution. The solution was stirred and maintained at 70° C. for an additional 15 minutes after the 2-MI had dissolved. The solution was then cooled to 50° C.

TABLE 1

| | A | B | C | D | E |
|---|---|---|---|---|---|
| Wt. % CMD 35201 | 82.4 | 82.4 | 82.4 | 82.4 | — |
| Wt. % Epon 828 | — | — | — | — | 22.1 |
| Wt. % DER 661-A-80 | — | — | — | — | 74.2 |
| Wt. % Dicyandiamide | 2.4 | 2.4 | 2.4 | 2.4 | 3.6 |
| Wt. % BDMA | — | — | — | — | 0.2 |
| Wt. % | 0.2 | 0.2 | 0.2 | 0.2 | — |

TABLE 1-continued

|  | A | B | C | D | E |
|---|---|---|---|---|---|
| 2-MI Wt. % | 15.0 | — | — | — | — |
| Airflex 400 Wt. % | — | 15.0 | — | — | — |
| Airflex 416* Wt. % | — | — | 15.0 | — | — |
| EVCL 4814 Wt. % | — | — | — | 15.0 | — |
| EVCL 4500* | | | | | |
| B-stage Temp., °C. | 150 | 150 | 150 | 150 | 150 |
| B-stage Time, Min. | 5.0 | 5.0 | 5.0 | 5.0 | 5.0 |
| Laminating Pressure, psi | 1,000 | 1,000 | 1,000 | 1,000 | 1,000 |
| Laminating Temp., °C. | 180 | 180 | 180 | 180 | 180 |
| Time @ Laminating Temp., Hr. | 1.0 | 1.0 | 1.0 | 1.0 | 1.0 |
| Resin Content, Wt. % | 31.1 | 37.7 | 31.0 | 30.2 | 35.8 |

*Possibility of covalent bonding between impact modifier and epoxy matrix.

An appropriate amount of CMD 35201 was charged into a separate container fitted with an air driven propeller-type agitator designed for high lift mixing. The agitator was set at medium speed and the 2-MI/dicy solution slowly added to the CMD 35201. The resulting solution was stirred for 15 minutes and the impact modifier (either Airflex 400, Airflex 416, EVCL 4500, or EVCL 4814) slowly added while maintaining medium agitation. The resulting aqueous laminating varnishes were stirred 30 minutes prior to impregnation onto glass cloth. Additives and/or fillers, if so desired, could be added at this point in the formulation scheme. The solvent based epoxy resin system for the G-10 laminate control sample was formulated by dissolving the ingredients in methyl cellosolve.

Style 7642 fiberglass cloth was utilized to prepare 15"×15" prepregs from the resin systems presented in Table 1. The wet prepregs were B-staged under the conditions in Table 1. The B-staged prepregs were cut into 7"×7" squares and press laminated by stacking thirty (30) individual pieces between steel caul plates with Tedlar mold release sheets between the caul plates and prepreg stack. The laminates were approximately $\frac{1}{4}$" thick and were utilized to prepare specimens for Instrumented Charpy Impact testing at 298° K. and 80° K. The test data is presented in Table 2.

Notched and unnotched Instrumented Charpy Impact specimens were machined from the experimental laminates and impact resistance measured at 298° K. and 80° K. Impact data is presented in Table 2.

In Table 2, the designation $U_T$ represents the total energy (in.-lb./in.$^2$) necessary for catastrophic failure while $U_i$ represents energy (in.-lb./in.$^2$) required to initiate a crack in the specimen. The difference ($\Delta U = U_T - U_i$), therefore, is a measure of the energy necessary for crack propagation through the specimen and is representative of the inherent material toughness. $\Delta U$ data is presented in Table 3.

TABLE 2

|  | A | B | C | D | E |
|---|---|---|---|---|---|
| Impact Modifier | Airflex 400 | Airflex 416 | EVCL 4814 | EVCL 4500 | Control |
| Total Energy ($U_T$) @ 298° K., Notched, in.-lb/in.$^2$ | 764.2 | 511.0 | 582.5 | 675.2 | 461.0 |
| Initiation Energy ($U_i$) @ 298° K., Notched, in.-lb/in.$^2$ | 343.7 | 258.5 | 356.4 | 344.1 | 303.7 |
| Total Energy ($U_T$) @ 298° K., Un-Notched, in.-lb/in.$^2$ | 1,136.8 | 750.9 | 776.6 | 935.3 | 602.1 |
| Initiation Energy ($U_i$) @ 298° K., Un-Notched, in.-lb/in.$^2$ | 422.5 | 436.9 | 473.0 | 408.6 | 449.7 |
| Total Energy ($U_T$) @ 80° K., Notched, in.-lb/in.$^2$ | 1,176.0 | — | — | 1,337.2 | 899.1 |
| Initiation Energy ($U_i$) @ 80° K., Notched, in.-lb/in.$^2$ | 260.7 | — | — | 373.3 | 560.8 |
| Total Energy ($U_T$) @ 80° K., Un-Notched, in.-lb/in.$^2$ | 1,301.9 | — | — | 1,307.4 | 851.4 |
| Initiation Energy ($U_i$) @ 80° K., Un-Notched, in.-lb/in.$^2$ | 256.3 | — | — | 361.0 | 709.3 |

TABLE 3

|  | A | B | C | D | E |
|---|---|---|---|---|---|
| Impact Modifier | Airflex 400 | Airflex 416 | EVCL 4814 | EVCL 4500 | Control |
| $\Delta U$ @ 298° K., Notched, in.-lb/in.$^2$ | 420.5 | 252.5 | 226.1 | 331.0 | 157.3 |
| $\Delta U$ @ 298° K., Un-Notched, in.-lb/in.$^2$ | 714.3 | 314.0 | 303.6 | 526.7 | 152.4 |
| $\Delta U$ @ 80° K., Notched, in.-lb/in.$^2$ | 915.3 | — | — | 963.9 | 338.3 |
| $\Delta U$ @ 80° K., Un-Notched, in.-lb/in.$^2$ | 1,054.6 | — | — | 946.4 | 142.1 |

The following conclusions can be drawn from the data in Tables 2 and 3.

From Table 2 it is apparent that the utilization of the designated ethylenic copolymers lead to significant improvements in overall impact strength ($U_T$) at 298° K. Modification of the epoxy matrix with Airflex 400 and EVCL 4500 (A and D) provides greater overall impact strength ($U_T$) than either Airflex 418 or EVCL 4814.

At 80° K., differences in impact strength between the G-10 control (E) and the experimental laminates (A and D) is even more pronounced.

The energy necessary for crack propagation through the specimen best demonstrates the influence of the disclosed ethylenic copolymers upon toughness at 298° K. and 80° K. Note from Table 3 that $\Delta U$ @ 298° K. for all experimental laminates is several magnitudes higher than the G-10 control.

At 80° K. (Table 3), the differences in $\Delta U$ magnitudes are even more pronounced; i.e., $\Delta U$ @ 80° K. for A (notched) is 915.3 in.-lb./in.$^2$ versus 338.3 in.-lb./in.$^2$ for the G-10 control. For notched specimens, $\Delta U$ for A is 1,054.6 in.-lb./in.$^2$ versus $\Delta U = 142.1$ in.-lb./in.$^2$ for the G-10 control.

In conclusion, the data illustrates that the disclosed ethylenic copolymers function as effective impact modifiers for thermosetting epoxy resin compositions. Furthermore, the data shows that covalent bonding between resin matrix and impact modifier is not a necessary condition for impact resistance improvement. Theoretically, this novel approach to improving impact properties is analogous to methods currently utilized to prepare engineering thermoplastics such as ABS, Noryl and the like.

One-fourth inch thick glass laminates were produced as previously described.

Vibration and sound damping in structures is becoming an increasingly important attribute of organic matrix composites. Damping factors (tan δ) were measured on the glass laminates at room temperature and 200 Hz. Table 4 presents the data.

TABLE 4

| Laminate | Type and Amount of Modifier | Damping Factor | % Increase Over Control |
|---|---|---|---|
| Control (G-10) | None | .0080 | — |
| A* | Airflex 400 - 15% | .0385 | 475 |
| D* | Airflex 4500 - 15% | .0360 | 450 |
| A | Airflex 400 - 15% | .0358 | 448 |
| D | Airflex 4500 - 15% | .0243 | 304 |

The data clearly shows that the disclosed laminates of our invention also have up to 475% higher damping characteristics compared to the G-10 control. Even higher values may be obtained when Kevlar cloth is used to replace the glass in the laminates of Table 4. This is shown in Table 5. (Tested at room temperature and 200 Hz.).

TABLE 5

| Laminate | Reinforcement | Damping Factor | % Increase Over Control |
|---|---|---|---|
| Control (G-10) | Glass | .0080 | — |
| Control* | Kevlar | .0175 | 218 |
| A | Kevlar | .0412 | 515 |

*Same as G-10 control except impregnated over Kevlar (a polyimide derived cloth)

The electrical properties of laminates made at the pilot plant (identified by an *) were determined. Dissipation factor (tan δ) and dielectric constant (ε') of the laminates at room temperature are given in Table 6 and compared to a standard NEMA grade G-10 laminate.

TABLE 6

| Laminate | 60 Hz | | 1 kHz | | 10 kHz | |
|---|---|---|---|---|---|---|
| | tan δ | ε' | tan δ | ε' | tan δ | ε' |
| G-10 | .004 | 5.3 | .005 | 5.2 | .009 | 5.2 |
| A | .019 | 5.2 | .021 | 5.1 | .016 | 4.9 |
| D | .020 | 6.1 | .023 | 5.9 | .022 | 5.7 |

The data indicates some residual moisture may be present in the water-based system but a higher state of advancement (B-stage) should remove the moisture prior to lamination.

Dielectric strength parallel and perpendicular to the laminates was measured and are given in Table 7. The laminates were conditioned 48 hours at 50% RH and tested according to ASTM D-149.

TABLE 7

| Laminate | Perpendicular to Lamina (Volts/Mil) | Parallel to Lamina (Volts/Mil) |
|---|---|---|
| A* | 370 | 214 |
| D* | 410 | 243 |
| G-10 | 445 | 300 |

The data shows somewhat lower dielectric strength than a standard G-10 but still very acceptable values.

Flexural strength and modulus values were measured at room temperature on laminates made in the lab and are reported in Table 8.

TABLE 8

| Laminate | Modifier | Flexural Strength ($10^3$ psi) | Flexural Modulus ($10^6$ psi) |
|---|---|---|---|
| Control* | None | 64.2 | 3.6 |
| A | 15% Airflex 400 | 50.2 | 3.1 |
| D | 15% Airflex 4500 | 54.1 | 3.2 |

*Same as G-10 control except impregnated over Kevlar

Interlaminar shear strength of laminates as measured by short beam shear is presented in Table 9.

TABLE 9

| Laminate | RT (psi) | −160° C. (psi) |
|---|---|---|
| Control | 6,600 | 15,600 |
| A | 3,700 | 10,600 |
| D | 3,600 | 10,200 |

Tables 8 and 9 show reductions in some mechanical properties over the control. This would indicate that some optimization studies are required to improve the adhesion to the reinforcing fabric.

We claim:

1. A composition comprising:
(A) a water emulsifiable thermosettable epoxy resin;
(B) an effective amount of a water compatible epoxy hardener;
(C) an effective amount of a water compatible catalyst for said epoxy resin;
(D) about 5 to about 35%, based on total resin solids, of a water compatible terpolymer polymerized from about 10 to about 60% of an ethylenic monomer selected from the group consisting of ethylene, propylene, and mixtures thereof, and about 40 to about 90% of a vinylic monomer selected from the group consisting of vinyl acetate, vinyl chloride, and mixtures thereof, and an acrylic monomer selected from the group consisting of acrylamide, acrylic acid, methacrylic acid, and mixtures thereof, where the amount of said acrylic monomer is sufficient to give an acid number of about 1 to about 60; and
(E) sufficient water to produce a viscosity of about 100 to about 100 to about 400 centipoises.

2. A composition according to claim 1 wherein epoxy resin has a pH of about 6 to about 8.

3. A composition according to claim 1 wherein said epoxy hardener is dicyandiamide.

4. A composition according to claim 1 wherein said catalyst is 2-methyl imidazole.

5. A composition according to claim 1 wherein said acrylic monomer is selected from the group consisting of acrylic acid, methacrylic acid, and mixtures thereof.

6. A composition according to claim 1 wherein said ethylenic monomer is ethylene.

7. An article comprising a substrate impregnated with a composition according to claim 1.

8. An article according to claim 7 wherein said substrate is a sheet of fibrous material.

9. An article according to claim 8 wherein said composition has been B-staged after impregnation.

10. A laminate comprising a stack of said articles according to claim 9, the compositions of which have been C-staged after stacking.

11. A powder comprising a spray dried composition according to claim 1.

12. A method of making a laminate comprising:
(A) impregnating sheets of a fibrous material with a composition according to claim 1;
(B) heating said sheets to coacervate or coagulate said composition, evaporate said water, and B-stage said composition;
(C) stacking said sheets; and
(D) heating and pressing said stacked sheets to C-stage said composition.

13. A composition according to claim 1 wherein the amount of said hardener is about 1.5 to about 7%, based on epoxy resin weight, and the amount of said catalyst is up to about 0.3%, based on epoxy resin weight.

14. A composition according to claim 1 wherein said epoxy resin has an E.E.W. of about 100 to about 1000.

15. A composition comprising
(A) a water emulsifiable thermosettable epoxy resin having an E.E.W. of about 100 to about 1000, and a pH of about 6 to about 8;
(B) about 1.5 to about 7%, based on said epoxy resin weight, of a water compatible epoxy hardener;
(C) up to about 0.3%, based on said epoxy resin weight, of a water compatible catalyst for said epoxy resin;
(D) about 5 to about 35%, based on total resin solids, of a water compatible terpolymer polymerized from about 10 to about 60% ethylene, about 40 to about 90% of a vinylic monomer selected from the groups consisting of vinyl acetate, vinyl chloride, and mixtures thereof, and an acrylic monomer selected from the group consisting of acrylamide, acrylic acid, methacrylic acid, and mixtures thereof, where the amount of said acrylic monomer is sufficient to give an acid number of about 1 to about 60; and
(E) sufficient water to produce a viscosity of about 100 to about 400 centipoises.

16. A composition according to claim 15 wherein said water compatible epoxy hardener is dicyandiamide, and said water compatible catalyst is 2-methyl imidazole.

* * * * *